(12) United States Patent
Yamauchi et al.

(10) Patent No.: US 6,770,992 B2
(45) Date of Patent: Aug. 3, 2004

(54) MAGNETIC BEARING APPARATUS (75) Inventors: Akira Yamauchi, Chiba (JP); Masayuki Yamamoto, Chiba (JP)

(73) Assignee: BOC Edwards Japan Limited, Tokyo (JP)

( * ) Notice: Subject to any disclaimer, the term of this patent is extended or adjusted under 35 U.S.C. 154(b) by 0 days.

(21) Appl. No.: 09/978,257

(22) Filed: Oct. 15, 2001

(65) Prior Publication Data

US 2002/0074883 A1 Jun. 20, 2002

(30) Foreign Application Priority Data

Oct. 16, 2000 (JP) ........................................ 2000-315662

(51) Int. Cl.$^7$ .............................................. H02K 7/09
(52) U.S. Cl. ..................................................... 310/90.5
(58) Field of Search ........................................ 310/90.5

(56) References Cited

U.S. PATENT DOCUMENTS

| | | | | |
|---|---|---|---|---|
| 4,629,262 A | * | 12/1986 | Hamilton | 310/90.5 |
| 5,084,643 A | * | 1/1992 | Chen | 310/90.5 |
| 5,130,589 A | * | 7/1992 | Kanemitsu | 310/90.5 |
| 5,530,306 A | * | 6/1996 | Ueyama | 310/90.5 |
| 5,703,424 A | * | 12/1997 | Dorman | 310/90.5 |
| 5,880,549 A | * | 3/1999 | Chiba et al. | 310/168 |
| 5,936,370 A | * | 8/1999 | Fukao et al. | 318/652 |
| 6,111,333 A | | 8/2000 | Takahashi et al. | 310/90.5 |
| 6,455,966 B1 | * | 9/2002 | Barada et al. | 310/90.5 |

FOREIGN PATENT DOCUMENTS

| | | | | |
|---|---|---|---|---|
| EP | 0739078 | | 10/1996 | ............ H02K/7/09 |
| EP | 1085225 | | 3/2001 | ............ F16C/39/06 |
| JP | 2-193547 | * | 7/1990 | ............ H02K/7/09 |

OTHER PUBLICATIONS

Patent Abstracts of Japan vol. 1996, No. 02, Feb. 29, 1996 JP 07 259854 A (Seiko Seiki Co LTD), Oct. 9, 1995.

* cited by examiner

*Primary Examiner*—Burton Mullins
(74) *Attorney, Agent, or Firm*—Adams & Wilks (57) ABSTRACT

To reduce vibration caused by an unbalance of magnetic force generated in a motor portion due to run-out of a rotor in a magnetic bearing apparatus having the motor portion. The vibration of the rotor is detected by means of a radial direction sensor mounted for controlling a magnetic bearing. Then, the vibration in the motor portion is inferred from the run-out of the rotor detected by the radial direction sensor by using the geometric positional relationship between the rotor and the radial direction sensor. The relationship between the unbalance amount of the magnetic force and the amount of run-out of the rotor in the motor portion is formed into the database through experiments or simulation in advance, and the unbalance amount of magnetic force is obtained from this database. Then, the magnetic force resisting the unbalance amount of this magnetic force is generated to offset this unbalance amount.

14 Claims, 8 Drawing Sheets

| PATTERNS | DIRECTION OF THE MAGNETIC FIELD GENERATED BY THE COIL 6 | DECLINATION γ FROM THE MAXIMUM TORQUE POINT OF THE ROTOR 1 | Fsx | Fsy |
|---|---|---|---|---|
| 1 | 0° | 0° | f1(Δx) | g1(Δy) |
|  |  | 20° | f2(Δx) | g2(Δy) |
|  |  | 40° | f3(Δx) | g3(Δy) |
| 2 | 60° | 0° | f1(Δx) | g1(Δy) |
|  |  | 20° | f2(Δx) | g2(Δy) |
|  |  | 40° | f3(Δx) | g3(Δy) |
| 3 | 120° | 0° | f1(Δx) | g1(Δy) |
|  |  | 20° | f2(Δx) | g2(Δy) |
|  |  | 40° | f3(Δx) | g3(Δy) |
| 4 | 180° | 0° | f1(Δx) | g1(Δy) |
|  |  | 20° | f2(Δx) | g2(Δy) |
|  |  | 40° | f3(Δx) | g3(Δy) |
| 5 | 240° | 0° | f1(Δx) | g1(Δy) |
|  |  | 20° | f2(Δx) | g2(Δy) |
|  |  | 40° | f3(Δx) | g3(Δy) |
| 6 | 300° | 0° | f1(Δx) | g1(Δy) |
|  |  | 20° | f2(Δx) | g2(Δy) |
|  |  | 40° | f3(Δx) | g3(Δy) |

Prior Art

MAGNETIC BEARING APPARATUS

BACKGROUND OF THE INVENTION

1. Field of the Invention

The present invention relates to a magnetic bearing apparatus and to a magnetic bearing apparatus for reducing vibration caused by run-out in a radial direction of a rotor.

2. Description of the Related Art

A magnetic bearing is constituted by the arrangement of, for example, a plurality of coils (electromagnets) around both end portions of a rotor (rotary member). In an ordinary bearing, a rotor is pivotally supported by means of ball bearings or the like. However, in the magnetic bearing, a magnetic field generated by coils is applied to the rotor and an attractive force due to this magnetic field is balanced so that the rotor is supported (or levitated) in a non-contact manner in a constant position in space.

A run-out of the rotor (a shift in the radial direction from the constant position, i.e., a shift in the radial direction of the rotor) is detected by means of a radial direction sensor arranged in the vicinity of the magnetic bearing portion. In order to adjust the attractive force of the coils so that the run-out always falls within a constant range, a current of the coils is fed back and controlled.

In such a system where the rotor is supported by the magnetic bearing and rotated, there are some cases where a gravitational center (or inertia center) of the rotor and a rotary axis of the rotor are not identical to each other. When the rotor is rotated in such a condition, in the rotor, a run-out rotation in synchronism with a rotary cycle of the rotor caused by the misalignment between the gravitational center and the rotary axis is generated. In order to suppress the run-out rotation, the magnetic bearing generates a brake force in synchronism with the rpm of the rotor. Due to this cyclic brake force, the run-out in synchronism with the rpm of the rotor on the stator side where the magnetic bearing coils are arranged is generated in accordance with the law of action and reaction.

For instance, in the case where a turbo molecular pump carrying a magnetic bearing is used in an electronic microscope and so on, one of the more serious problems to be solved is how to control the vibration generated in the turbo molecular pump.

Attempts for suppressing the vibration caused by the above-described misalignment between the rotary axis of the rotor and the gravitational center thereof have been made. For instance, Japanese Patent Laid-open No. 259854/1995 discloses a magnetic bearing apparatus as such a magnetic bearing.

Figure 11:
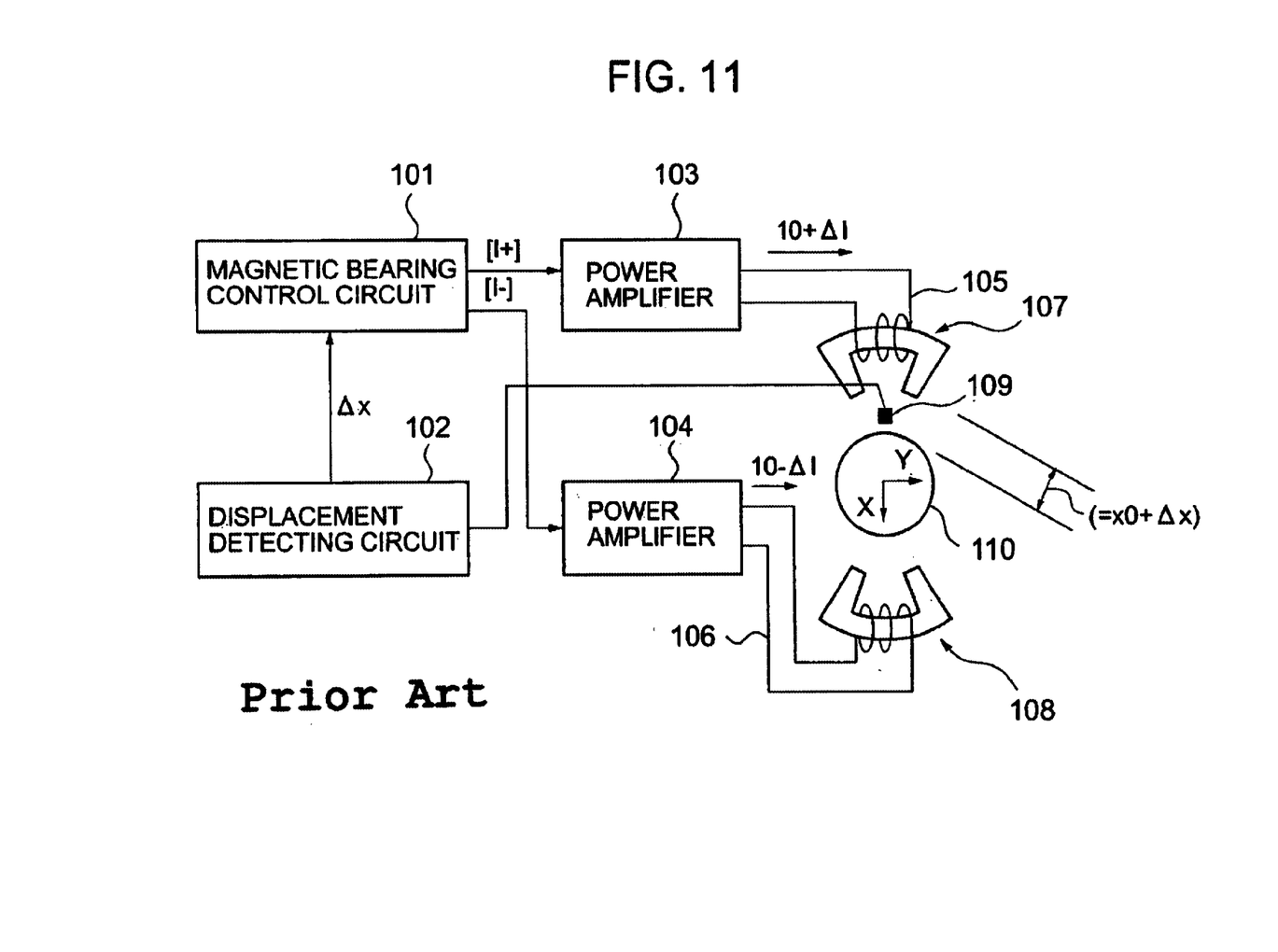
FIG. 11 is a view showing a conventional magnetic bearing apparatus.

This magnetic bearing apparatus is shown in FIG. 11. A rotor 110 is pivotally supported at an air gap X0 from coils 107 and 108 by the balance of the attractive force of the coils. The vibration ΔX of the rotor 110 is detected by means of a radial direction sensor 109 and a shift detector circuit 102. A magnetic bearing control circuit 101 feeds to power amplifiers 103 and 104 a signal of current to flow through the coils 107 and 108 for offsetting ΔX.

In accordance with a signal of the magnetic bearing control circuit 011, the power amplifier 103 feeds a current I0+ΔI to the coil 107 and the power amplifier 104 feeds a current I0−ΔI to the coil 108. The rotor 110 is returned back to a constant position X0 by means of the attractive force of the coils 107 and 108 receiving this current feed. Here, I0 is a bias current to flow through the coils 107 and 108, and ΔI is the shift component of coils by a positional control signal of the rotor generated in the magnetic bearing control circuit 101 when the air gap is generated by ΔX.

The magnetic bearing apparatus disclosed in this Japanese Patent Laid-open No. 259854/1995 is to separately control ΔI for a frequency (expressed as fr) equal to the rpm of the rotor 109 and the frequency components other than that out of power spectrum of the shift signal outputted from the radial direction sensor 109.

The explanation will be given with reference to formulae. In general, the attractive force F generated by the coils used in the magnetic bearing is given by the following formula.

$$F=K\{(I0+\Delta I)/(X0+\Delta X)\}^2 \quad (1)$$

Where, K is the constant determined by the number of turns or the shape of the coils.

A band-pass filter for passing a signal of the frequency fr and a band-pass filter for passing signals other than the frequency fr are connected in parallel with each other within the magnetic bearing control circuit 101 The shift signal ΔX of the rotor 110 is inputted into these filters and this signal is separated into the component having the frequency fr and the others (The components due to the run-out by the misalignment between the rotary center of the rotor 110 and the inertia center thereof is included in the signal of the frequency component fr).

For the shift signal ΔX having the components other than the frequency fr obtained from the band-pass filters, the current of the coils are fed back and controlled in the same manner as in the conventional magnetic bearing apparatus.

The component ΔX having the frequency fr obtained through the band-pass filters is controlled to become the value expressed by the following Formula (2). Then, the attractive force of the coils is kept constant as indicated by Formula (3).

$$\Delta I=(I0/X0)\Delta X \quad (2)$$

$$F=K(I0/X0)^2 \quad (3)$$

As shown in Formula (3), since for the vibration having the frequency component fr, the attractive force for affecting the coils 107 and 108 is always kept constant, there is no vibration of the frequency fr in the magnetic bearing portion. Namely, the vibration (having the frequency fr) caused by the misalignment between the rotary axis and the inertia axis of the rotor 110 (in other words, it is safe to say that the gravitational center of the rotor 110 is not on the rotary axis) would not generate.

Note that a magnetic pole is provided in the central portion of the rotor supported at both ends by the magnetic bearings. The stator provided with coils (motor windings) is arranged around its periphery. A motor portion is formed in the rotor. In this case, when the rotor is vibrated in the radial direction, there is an unbalance in the magnetic force affecting the rotor by the magnetic field generated by the stator. This unbalance of the magnetic force is one of causes for generating the vibration upon the rotation of the rotor.

However, in the magnetic bearing apparatus disclosed in this Japanese Patent Application Laid-open, the vibration caused by the magnetic bearing per se may be suppressed but the vibration caused by the unbalance of the magnetic force in the above-described motor portion could not be suppressed although the existence thereof is clear.

Note that, brush-less DC motors carrying strong permanent magnets have been extensively used in accordance with the recent demands for miniaturization and high efficiency of the motors. In the case where the motor portions are formed by these motors, the vibration is likely to generate due to the magnetic unbalance concomitant with the phase of the permanent magnets in addition to the simple unbalance of the magnetic force caused by the difference in air gap intervals.

Further, there would be some cases where the rotor sticks to the stator due to the attractive force of the magnetic field so that the rotor could not be lifted by the magnetic bearings. In some cases, for this reason, the magnetic bearings must be enlarged more than necessary and the capacitance of the current amplifier must be increased.

Accordingly, in view of this point, an object of the present invention is to provide a magnetic bearing apparatus for reducing vibration in a bearing portion and a motor portion.

SUMMARY OF THE INVENTION

In order to attain the above-described object, according to the present invention, there is provided a magnetic bearing apparatus characterized by comprising a rotor, a motor portion provided in the rotor for rotating the rotor by a magnetic force, magnetic supporting coils for magnetically supporting the rotor in a predetermined position, magnetic force unbalance obtaining means for obtaining an unbalance of the magnetic force generated in the motor portion by the rotor run-out in the radial direction from the predetermined position and applied to the rotor, and magnetic support adjustment means for adjusting the magnetic force of the magnetic supporting coils so as to resist the unbalance of the magnetic force.

If the magnetic bearing apparatus is thus constructed, a force effective for resisting unbalance of the attractive force between the rotor and the stator caused by run-out of the position of the rotor in the radial direction is generated in the magnetic bearing to thereby make it possible to reduce the vibration of the stator.

Further, the predetermined position of the rotor may be the position obtained in the case where the rotor is rotated with the rotary axis of the rotor passing through the gravitational center of the rotor, i.e., when the rotor is rotated about the inertia center or the position obtained in the case where the magnetic force of the coils are corrected so that the magnetic force to be applied between the coils and the rotor is kept constant for one cycle through which the rotor is rotated for the variation of the air gap of the magnetic coils and the rotor and generated when the rotor is rotated about the intertia center.

The motor portion may be, for example, a brush-less DC motor. The brush-less motor is composed of a permanent magnet fixed to a rotor and a plurality of coils arranged around this permanent magnet. Then, the magnetic poles of these coils are switched over in order to generate a rotary magnetic field so that the permanent magnet of the rotor is caused to attract and follow the rotary magnetic field to thereby rotate the rotor.

When the position of the rotor is swung in the radial direction, an unbalance is generated in the attractive force between the permanent magnet and the coils. This is a cause for vibration of the motor portion. For this reason, the attractive force for offsetting the unbalance of this attractive force is generated in the coils of the magnetic bearing portion.

Further, it is possible to calculate the run-out of the rotor in the motor portion by detecting the run-out of the rotor by a radial direction sensor and calculate it from the geometric positional relation among the motor portion, the radial direction sensor, and the rotor, and the run-out value. If the run-out of the rotor in the motor portion is inferred in this way, it is possible to obtain the unbalance between the rotor and the stator in the motor portion from the angle of the magnetic field and the rotational angle of the magnetic poles of the rotor and the value of this run-out vibration through calculation or experimental values. Then it is possible to control the bearing force of the magnetic bearing so as to offset the unbalance of the magnetic force. In addition, the unbalance of the magnetic force may be kept in the form of a database of the angle of the magnetic field, the rotational angle of the magnetic poles and the run-out vibration of the rotor as variables in advance. Then, when the unbalance of the magnetic force is obtained from the run-out vibration of the rotor, it is possible to obtain the unbalance from the database by using the angle of the magnetic field, the rotational angle of the magnetic poles and the amount of run-out at this time.

Further, the unbalance of the attractive force due to the run-out of the rotor in the motor portion may be inferred from the value of the sensor directly mounted within the motor for detecting the magnetic flux between the rotor and the stator. The relationship of the unbalance of the magnetic force between the rotor, the stator and the value of the magnetic flux detected by the sensor, the angle of the magnetic field and the rotational angle of the magnetic poles are obtained through the magnetic field analyses or experiments.

Further, a sensor such as an acceleration sensor for obtaining the vibration generated by the rotation of the rotor is installed in, for example, the stator of the motor portion and is subjected to a mechanism for controlling the current of the coils of the magnetic bearing portion so that the vibration to be detected by the sensor upon the rotor rotation is reduced, whereby the vibration generated by the rotation of the rotor may be further reduced.

DESCRIPTION OF THE PREFERRED EMBODIMENTS

An embodiment of the present invention will now be described with reference to FIGS. 1 to 10 in more detail.

Figure 1:
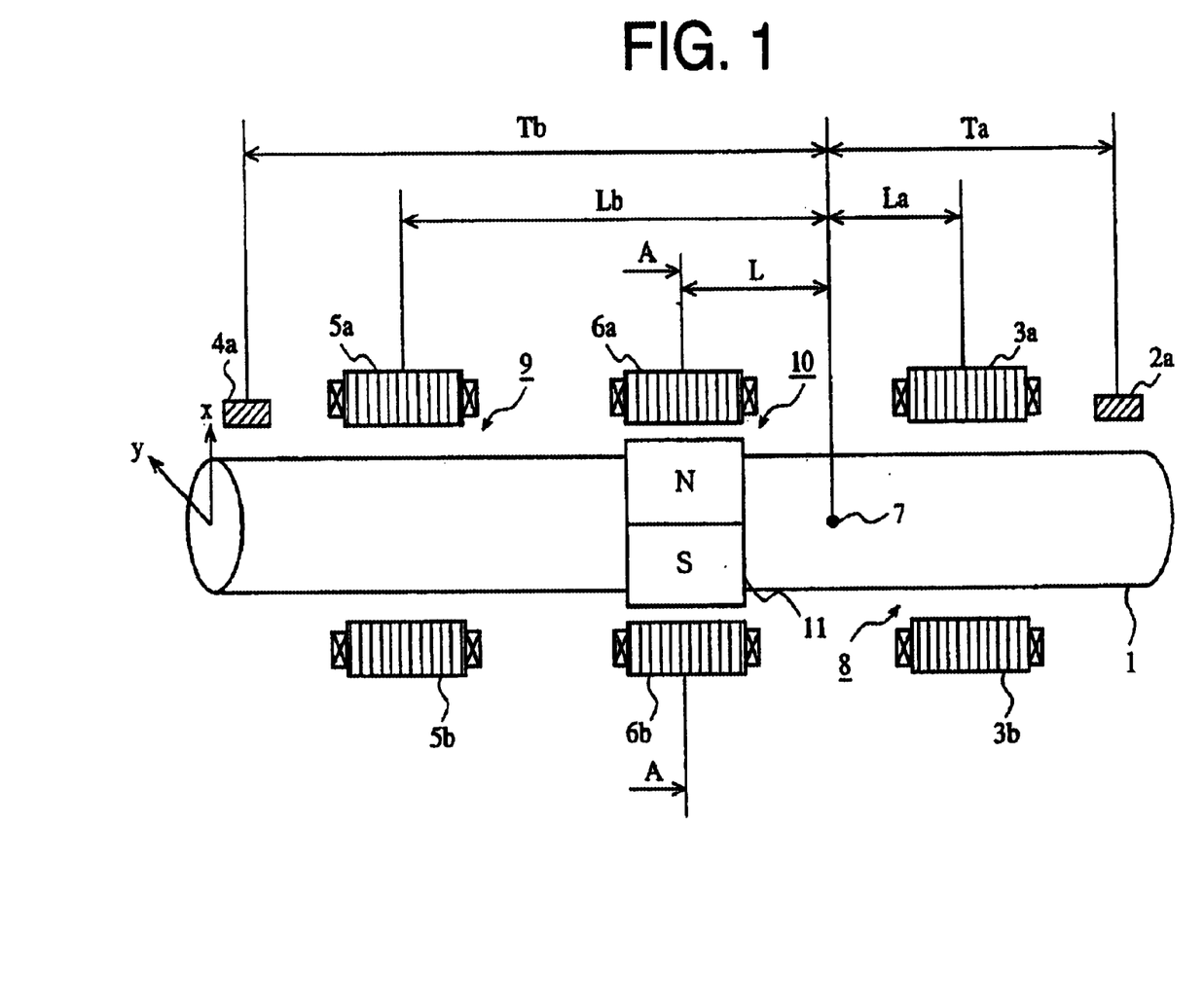
FIG. 1 is a view showing a magnetic bearing apparatus in accordance with an embodiment of the present invention.

FIG. 1 is a view showing a magnetic bearing apparatus in accordance with the embodiment.

It is assumed that, as shown in the drawings, the x-axis is directed from the center of the cross-section of the rotor 1 upwardly in the paper surface and the y-axis is directed from the paper surface in a direction backwardly.

Magnetic bearing portions 8 and 9 and a motor portion 10 are formed at both ends and a central portion of the rotor 1, respectively. Coils 3a and 3b are arranged at a predetermined air gap in the magnetic bearing portion 8. The coils 3a and 3b attract the rotor 1 with each other and the rotor 1 is held in a non-contact manner in a predetermined position in the x-direction by the balance of the attractive force. Although not shown, a pair of coils 3c and 3d are arranged also in the y-direction and the rotor 1 is held in a predetermined position in the y-direction.

A radial direction sensor 2a is further arranged in the x-direction in the end portion direction of the rotor 1. The radial direction sensor 2a detects the run-out of the rotor 1 in the x-direction in a non-contact manner. Further, although not shown, a radial direction sensor 2b for detecting the run-out of the rotor 1 in the y-direction is arranged in the y direction (in the paper backside direction) in the same manner.

The control unit of the magnetic bearing apparatus detects the run-out of the rotor 1 by means or the radial direction sensors, performs the feedback control of the current of the coils 3a and 3b on the basis of this value, and performs the feedback control so that the air gap in the x direction of the bearing portion 8 becomes a predetermined value. Although not shown, also in the y direction, the magnetic force of the coils 3c and 3d is fed back and controlled so that the air gap in the y direction of the bearing portion 8 becomes a predetermined value.

In the same manner, the coils 5a and 5b in the x direction, the coils 5c and 5d (not shown) in they direction, the radial direction sensor 4a in the x direction and the radial direction sensor 4b in the y direction are arranged in the magnetic bearing portion 9,. The structure and function of these components are the same as those of the bearing portion 8.

The motor portion 10 is composed of a permanent magnet 11 composed of an N-pole and an S-pole fixed to the rotor 1 and a stator where six coils are arranged around this permanent magnet 11. In view of the drawing capacity, two coils 6a and 6b are shown.

The drive of the motor portion 10 is performed by feeding three-phase alternating current to these coils 6a and 6b and the like and by switching the polarities of the coils in order, thereby generating a rotary magnetic field. The N-pole and S-pole of the permanent magnet 11 fixed to the rotor 1 are attracted to the rotary magnetic field so that the rotor 1 rotates in accordance with the rotation of the magnetic field.

Hereinafter, the sensors and the coils are simply referred to as, for example, sensor 2, coil 6 in the case where the components are the same elements like the sensors 2a and 2b and the coils 6a and 6b and do not have to be distinguished from each other.

In the embodiment, in the thus constructed magnetic bearing apparatus, the unbalance of the magnetic force generated in the motor portion 10 by the run-out of the rotor 1 in the following steps is obviated.

(1) The run-out of the rotor 1 in the motor portion 10 is inferred from the run-out of the rotor 1 detected by the radial direction sensors 2 and 4.

(2) The unbalance of the magnetic force whose generated magnetic field affects the permanent magnet 11 in the coils 6 is interred from the run-out of the rotor 1 in the motor portion 10.

(3) The above-described unbalance of the magnetic force is offset by means of the attracting force (magnetic force) of the magnetic bearing portions 8 and 9 to the rotor 1.

The above-described (1) to (3) will now be described below.

(1) The run-out of the rotor 1 in the motor portion 10 is inferred from the run-out of the rotor 1 detected by the radial direction sensors 2 and 4.

The run-out of the rotor 1 is detected by the radial direction sensors 2 and 4 and the run-out of the rotor 1 in the motor portion 10 is calculated from the geometric positional relation of the radial direction sensors 2 and 4, the motor portion 10 and the rotor 1.

If the method for thus estimating the run-out of the rotor 1 in the motor portion 10 from the detection values of the radial direction sensors 2 and 4 is adapted, it is possible to utilize the well known sensors without any necessity to install a new sensor for detecting the run-out of the rotor 1 in the motor portion 10.

As shown in FIG. 1, L is the distance from the gravitational center 7, of the rotor 1 to the center of the coil 6, Lb is the distance to the center of the coil 5 of the magnetic bearing, Tb is the distance to the radial direction sensor 4, La is the distance to the center of the coil 3 and Ta is the distance to the radial direction sensor 2. Note that, these distances are the distances in the axial direction of the rotor 1.

Now, if $Xa \times \sin\theta_1$ is the run-out in the x direction of the rotor 1 detected by the radial direction sensor 4a and $Xb \times \sin\theta_2$ is the run-out in the x direction of the rotor 1 detected by the radial direction sensor 2a, the run-out $\Delta X$ in the x direction of the rotor 1 of the motor 10 maybe expressed by the following formula. Here, $\theta_1$ and $\theta_2$ represent the phases at any time t, respectively. The phase $\theta$ is generally expressed by $=\omega \times t$ where $\omega$ is the angular velocity of the rotor 1 and t is the time. Also, the run-out $\Delta Y$ of the y direction is also calculated by the radial direction sensors 2b and 4b.

$$\Delta X = Xa + (Xb - Xa) \times (Ta + L)/(Ta + Tb) \quad (4)$$

$$\Delta Y = Ya + (Xb - Xa) \times (Ta + L)/(Ta + Tb) \quad (5)$$

(2) The unbalance of the magnetic force of magnetic field generated by the coils 6 to the permanent magnet 11 is inferred by the run-out of the rotor 1 in the motor portion 10.

Then, the method for obtaining the unbalance of the magnetic force generated between the magnetic pole 11 and the magnetic field generated by the coils 6 from the run-out of the rotor 1 in the motor portion 10 will now be described.

The mechanism of the brush-less DC motor will first be described.

Figure 2:
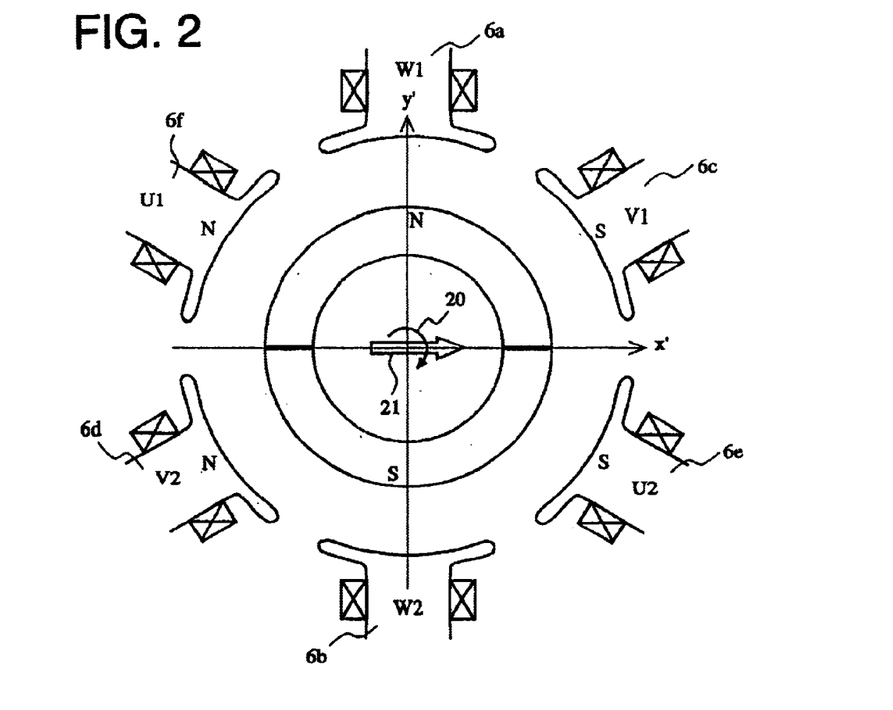
FIG. 2 is a cross-sectional view of a motor portion 10 taken along the line A—A of FIG. 1.

FIG. 2 is a cross-sectional view taken along the line A—A of FIG. 1. The number of the coils 6 is six as shown in the drawing. The U, V and W phase currents are caused to flow through the coils 6e and 6f, 6c and 6d and 6a and 6b, respectively. The respective coils form the pairs. The conductive wires are connected with each other so that the polarities are opposite when the currents are caused to flow. For example, when the current of U phase is caused to flow in a direction of the coils 6e and 6f, the coil 6f becomes the N-pole and the coil 6e becomes the S-pole, whereas when the current is reversed, the coil 6f becomes the S-pole and the coil 6e becomes the N-pole. The same relationship is established for the coils 6c and 6d of the V phase and the coils 6a and 6b of the W phase.

Under the condition shown in FIG. 2, the U and V-shape coils are magnetically excited, and the composite magnetic field (the magnetic field, the direction indicated by an arrow 21 of thick solid lines) is in the x' direction. Note that, the x' axis is in the direction from the N-pole to the S-pole of the composite magnetic field and the direction perpendicular to this is in the y, axis (in the coil direction of the non-electric supply phase).

The currents to be fed to the coils 6 are switched over in order to switch the polarities of the coils 6 one after another so that the composite magnetic field is rotated in a direction where the rotor 1 is to be rotated as desired (for example, in the direction indicated by an arrow 20 indicated by a thin line). The permanent magnet 11 fixed to the rotor 1 is attracted to this rotary magnetic field to rotate the rotor 1. The switch-over of the currents is controlled by a motor driver while detecting the position of the magnetic poles 11.

As shown in FIG. 2, the maximum torque is applied to the rotor 1 when the composite magnetic field of the coils 6 is at 90 degrees to the direction of the magnetic field of the permanent magnet 11.

Note that, when the phases of the currents to be fed to the coils 6 are switched over to thereby rotate the magnetic field, the following explanation will be given assuming the above-described x' axis and y' axis are also rotated.

Next, in the case where the run-out generates in the rotor, in the motor portion 10, it will be discussed how unbalance of the magnetic force influences in the rotor 1.

First of all, the condition that the run-out is not generated in the motor portion 10, i.e., the case of X0=Y0=δ0 will be discussed. Here, X0 and Y0 are the air gaps between the coils 6 and the rotor 1 in the x' direction and the y' direction when the rotor 1 is at the center of the motor, respectively. δ0 is a predetermined constant.

Figure 3:
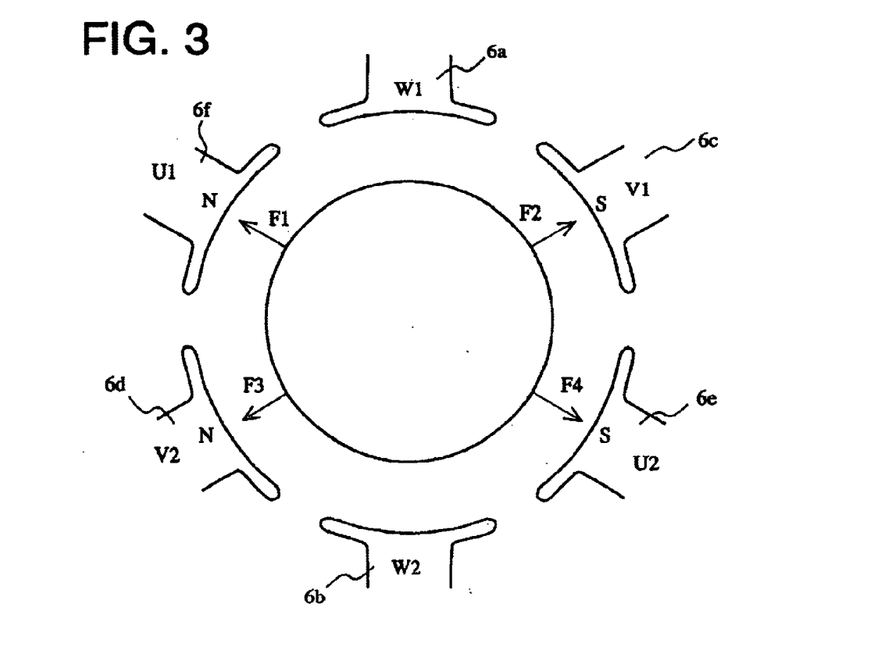
FIG. 3 is a view showing a magnetic force of a stator coil acting on a rotor in the case where the rotor is not provided with any permanent magnet 11.

If the permanent magnet 11 is not loaded on the rotor 1, as shown in FIG. 3, the magnetic forces applied to the rotor 1 are F1, F2, F3 and F4, and the F1 and F4 and the F2 and F4 are opposite in size and direction. Accordingly, the composite force obtained by adding F1 to F4 becomes zero. Accordingly, there is no unbalance in magnetic force.

Then, the magnetic force acting on the rotor 1 from the coils 6 when the rotor 1 carrying the permanent magnet 11 is in the center of the motor will be discussed.

Figure 4:
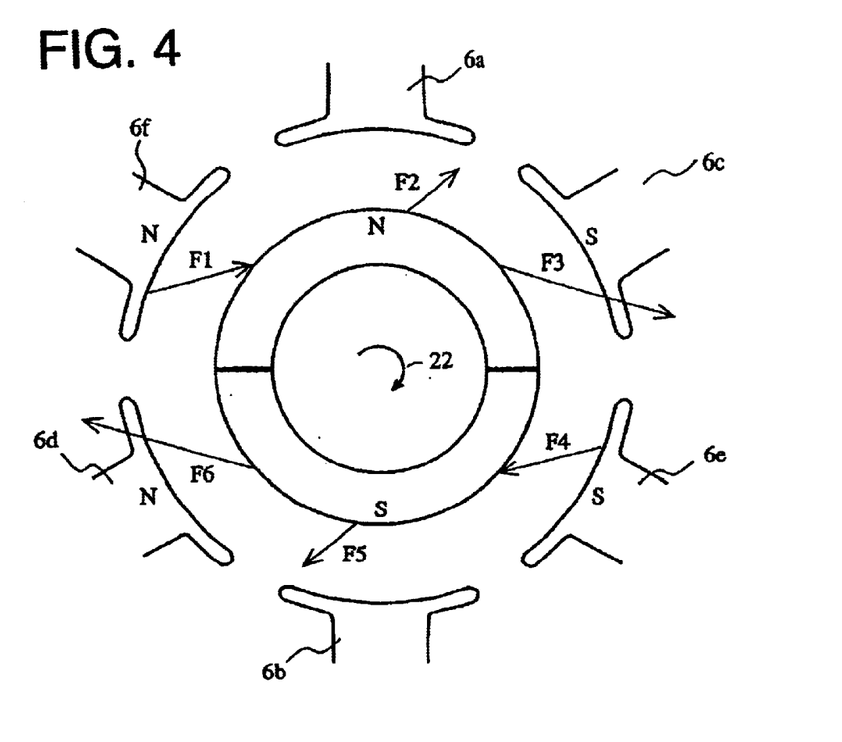
FIG. 4 is a view showing a magnetic force of a stator coil acting on a rotor in the case where the rotor is provided with a permanent magnet 11.
Figure 5:
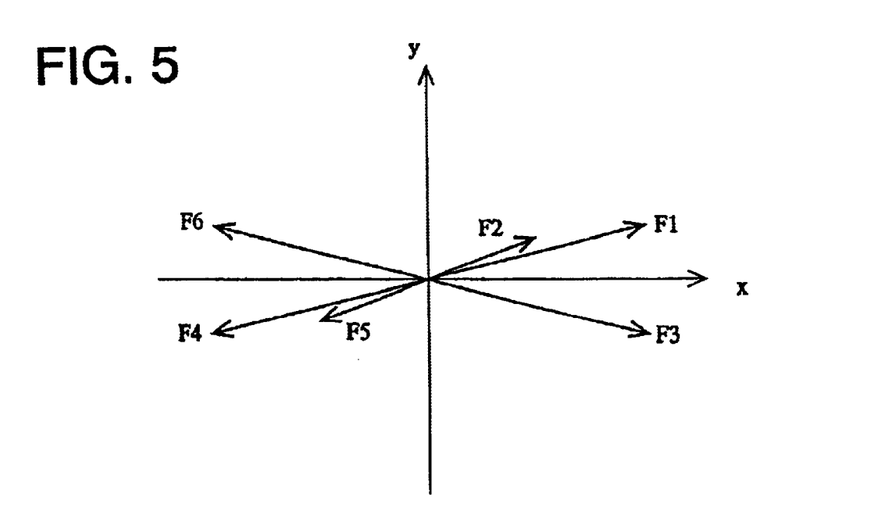
FIG. 5 is a vector diagram showing a magnetic force, of each stator coil, acting on a permanent magnet 11.

An example of the magnetic force acting on the rotor 1 in this case is shown in FIG. 4. The permanent magnet 11 receives the magnetic forces F1 to F6 from the coils 6. The vector view showing the relationship among these forces is shown in FIG. 5. As shown in this drawing, since F3 and F6, F2 and F5 and F1 and F4 are opposite to each other in direction but the same in size, respectively, the sum of these forces becomes zero so that no force in the radial direction generates in the rotor 1. However, as is apparent from FIG. 4, the magnetic forces F1 to F6 generate a torque for rotating the rotor 1 in the direction indicated by an arrow 22. Namely, the force for moving in the radial direction the rotor 1, which causes the motor portion 10 to vibrate, is not generated but only the torque for rotating the rotor 1 generates However, in general, the run-out of the rotor 1 generates in the motor portion 10, with the result that the unbalance of the magnetic force generates and the vibration generates in accordance with the rotation of the rotor 1.

Figure 6:
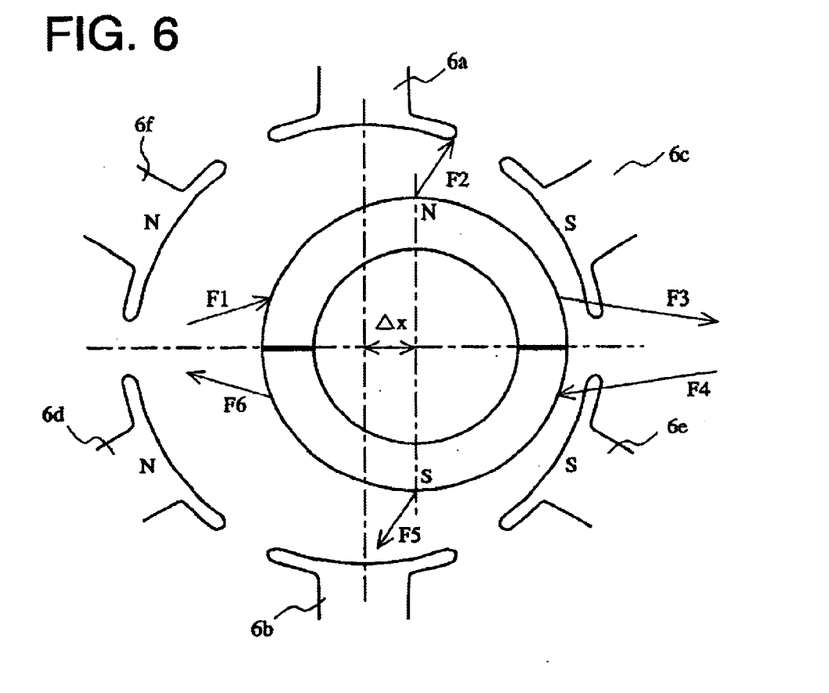
FIG. 6 is a view showing a magnetic force, of the stator coil, acting on the permanent magnet 11 in the case where the rotor is swung by $\Delta X$ in the x' direction.

The magnetic force of the magnetic field by the coils 6 acting on the rotor 1 in the case where the rotor 1 is swung by ΔX in the x direction in the motor portion 10, as shown in FIG. 6, will be discussed. In this case, the following relationship is established.

$$|F1|<|F4| \quad (6)$$

$$|F6|<|F3| \quad (7)$$

Now, if δ0=1 [mm] and ΔX=0.2 [mm], the following formulae are given.

$$X0-\Delta X=0.8[mm] \quad (8)$$

$$X0+\Delta X=1.2[mm] \quad (9)$$

It is assumed that the magnetic force acting between the rotor 1 and the coil 6 is in proportion to the second powered value of the air gap, the following relationship is substantially established.

$$|F1|=(0.8/1.2)^2\times|F4|=0.444|F4| \quad (10)$$

$$|F6|=(0.8/1.2)^2\times|F3|=0.444|F3| \quad (11)$$

Figure 7:
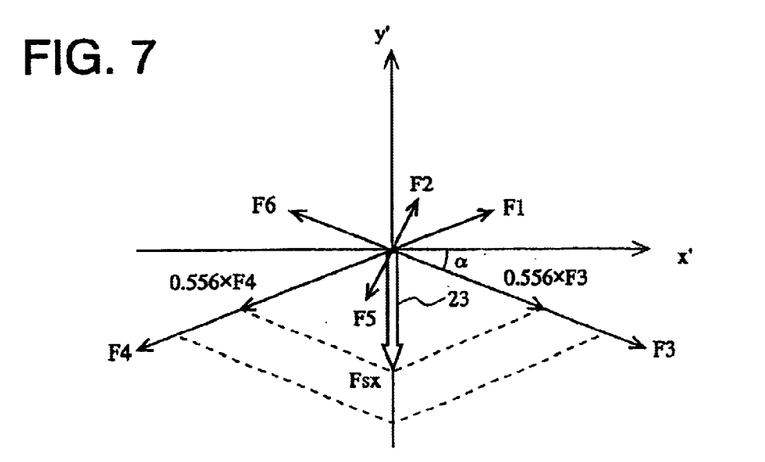
FIG. 7 is a vector view showing a magnetic force, of the stator coil, acting on the permanent magnet 11 in the case where the rotor is swung by $\Delta X$ in the x' direction.

The forces F1 to F6 are shown in the vector view of FIG. 7. It will be understood that the composite vector 23 of the magnetic forces (Fsx) is in the -y' direction. Note that, F2 and F5 are the same in size and opposite in direction and hence are offset.

From the above, it will be understood that, when the rotor is swung in the x direction, the magnetic force Fsx in the -y direction from the magnetic field generated by the coils 6 is applied to the rotor 1. Here, the angle a is the angle formed by the x' axis and the F3.

Also, in the same manner, when the rotor 1 is swung in the y' direction, the magnetic force Fsy in the -x' direction from the magnetic field generated by the coils 6 is applied to the rotor 1.

In the case where the rotor 1 is swung by ΔX in the x' direction and swung by ΔY in the y' direction, the magnetic force Fs applied to the rotor 1 is the composite force of Fsx and Fsy and is given by the following formula. Here, any one of Fs, Fsx and Fsy is a vector amount.

$$Fs=Fsx+Fsy \quad (12)$$

The method for seeking Fsx will now be described. Fsx is a function of three variables including X, the direction of the magnetic field generated by the coils 6 and the rotary angle γ from the maximum torque of the rotor 1 (assuming that the size of the magnetic field generated by the coils 6 is kept constant). This is the case with respect to Fsy.

In order to obtain Fs from Fsx and Fsy in accordance with Formula (12), Fsx and Fsy are obtained in advance for various values of these three variables and formed into the database. This is then utilized.

Incidentally, the directions of the magnetic field generated by the coils 6 are six kinds of 0°, 60°, 120° 180°, 240° and 300° in view of the xy coordinate system fixed to the coils 6. However, γ is the continuous amount from 0 to 60 (when γ reaches 60°, the magnetic field of the coil 6 is switched over to the next phase and becomes 0°), and ΔX is also the continuous amount. Accordingly, if Fsx is obtained over all these three variables, the number of the data is tremendous or huge and it is difficult to perform the data process or the like.

Figure 8:
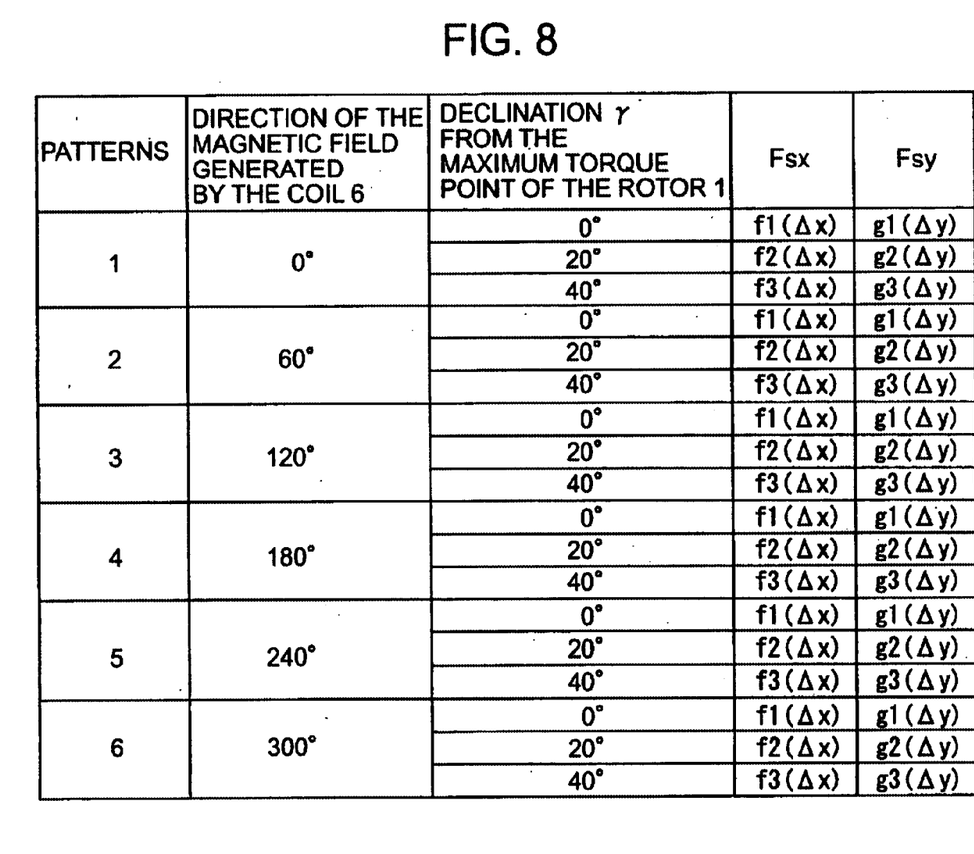
FIG. 8 is a table showing a relationship of Fsx and Fsy together with a pattern etc. of magnetic field of the stator coil.

Therefore, as shown in FIG. 8, the rotational angle from the maximum torque point of the rotor 1 is considered for three cases of if γ is 0°, 20° or 40° by every 20°. When Fsx is actually obtained, if γ is 0°±10°, γ is 0°, and if γ is 20±10°, γ is 20° and if γ is 40°±10°, γ is 40°. Here, γ is assumed to sort into any one of 0°, 20° or 40°. Note that, the above-described rotational angle is not limited to 0°, 20° or 40°.

If the value of γ is thus limited, Fsx is a one variable function of ΔX using the direction of the magnetic field generated by the coil 6 and 7 as the two parameters.

In the same manner, Fsy is a one variable function of ΔY.

FIG. 8 shows a table showing the relationship among the direction of the magnetic field generated by the coil 6, δ and Fsx and Fsy.

This table is divided into six patterns in accordance with the direction of the magnetic field generated by the coil 6. The respective patterns are further divided into three in accordance with three γ's, i.e., 0°, 20°, 40°. Then, for example, in pattern 1, γ is fixed to 0°, Fsx when the rotor 1 is shifted by ΔX in the x' direction is f1 (ΔZ), f1 (ΔZ) is obtained with respect to various ΔX by the magnetic field analyses or experiments or the like in advance and formed into the database. In the same manner, f2 (ΔX) and f3 (ΔX) are obtained and formed into the database. Also, since the motor portion 10 has a contrasting structure to each pattern of the magnetic field generated by the coil 6, the f1 (ΔX), f2 (ΔX) and f3 (ΔX) obtained by the pattern 1 may be applied to the other patterns. In the same manner, with respect to Fsy, the g1 (ΔY), g2 (ΔY) and g3 (ΔY) are formed into the database.

Also, the above-described f1 (ΔX) and the like are not formed into the database but, for example, the approximation formation thereof may be obtained by using a minimum second power method and ΔX may be substituted for this to calculate the values.

The direction of the magnetic field generated by the coil 6 may be obtained by monitoring each current waveform of the U-phase, V-phase and W-phase of the motor.

Also, since γ is the relative angle of the magnetic pole 11 to the magnetic field generated by the coil 6, in order to obtain γ, it is necessary to know the position in the rotational direction of the magnetic pole of the permanent magnet 11 and the direction of the magnetic field generated by the coil 6.

The switchover point of the N-pole and the S-pole of the permanent magnet 11 is detected. The position of the magnetic poles of the permanent magnet 11 i.e., the phase of the rotor 1 relative to the stator is then detected by means of the switchover point and the information of the rpm. Here, in order to detect the switchover point of the poles of the permanent magnet 11, it is possible to use a hardware external sensor such as a Hall element or it is possible to use a so-called sensorless driver by which, for example, the motor is caused to run free and the switchover point is inferred from the induction electromotive force induced by the motor windings at this time.

(3) The above-described unbalance of the magnetic force is offset or canceled by means of the attractive force (magnetic force) of the magnetic bearing portions 8 and 9 acting on the rotor 1.

Then, a description will be made of the method for offsetting the unbalance of the magnetic force between the coil 6 and the rotor 1 generated due to the run-out of the rotor 1 in the above-described motor portion 10 by means of the magnetic force of the magnetic bearing portions 8 and 9.

Since Fs of Formula (12) is described in terms of the x'–y' coordinate system rotating together with the magnetic field, this is converted into tie x-y coordinate system fixed to the coil 6 (or stator). Since Fs is the vector amount, the x component of this is Fx and the y component is Fy. In addition, with reference to FIG. 9, it is assumed that the respective magnetic forces applied to the rotor 1 in the x and y directions in the bearing portion 8 are Fax and Fay and the respective magnetic forces applied to the rotor 1 in the x and y directions in the bearing portion 9 are Fbx and Fby. For the sake of easy understanding, the explanation of the coils of the magnetic bearing will be made only with the coils 3a and 3c for the bearing portion 8 and with the coils 5a and 5c for the bearing portion 9. The coils 3b, 3d, 5b and 5d operate in the same manner as in the coils 3a, 3c, 5a and 5c (not shown).

Figure 9:
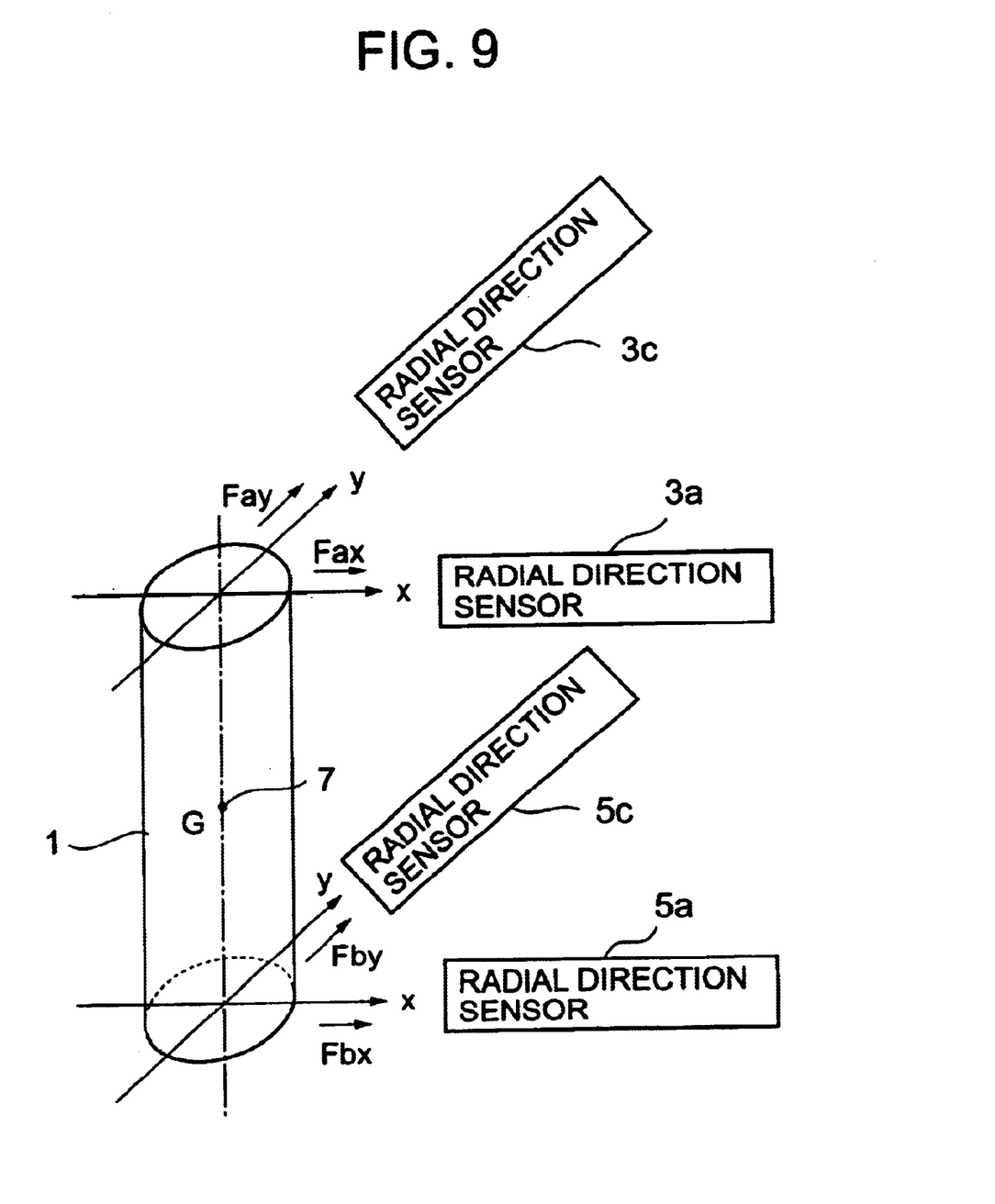
FIG. 9 is a view showing the attractive force of the coil of the magnetic bearing and the rotor.

Formulae (13) and (14) are established from the balance of the forces applied to the rotor 1. Also, Formulae (15) and (16) are established from the balance of the moments about the gravity center 7 of the rotor 1.

$$Fx = Fax + Fbx \quad (13)$$

$$Fy = Fay + Fby \quad (14)$$

$$Fax \times La + Fbx \times Lb = -Fx \times L \quad (15)$$

$$Fay \times La + Fby \times Lb = -Fy \times L \quad (16)$$

The simultaneous equations of Formulae (13) to (16) are solved whereby it is possible to obtain the magnetic forces Fax, Fbx, Fay and Fby that are necessary for the magnetic bearings 8 and 9 in order to offset the unbalance of the magnetic forces generated in the motor portion 10.

Then, current values for generating the magnetic forces Fax and Fay in the coil 3 and the magnetic forces Fbx and Fby in the coil 5 become necessary.

The relationships of Formulae (17) to (20) are established between the currents fed to the magnetic bearings a and 9 and the magnetic forces generated. These relationships may be formed into the database by obtaining these through the magnetic field analyses, the experiments and the like. Also, for example, the appropriation formula is obtained by using the minimum second power method. This may then be used as a formula of a function t. Here, Iax, Iay, Ibx and Iby are the currents to be fed to the coils 3a, 3c, 5a and 5c, respectively.

$$Fax = f(Iax) \quad (17)$$

$$Fay = f(Iay) \quad (18)$$

$$Fbx = f(Ibx) \quad (19)$$

$$Fby = f(Iby) \quad (20)$$

If the current values are expressed inversely in terms of the magnetic forces from the relationships of Formulae (17) to (20), the following relationships are established. Note that, function $f^{-1}$ is the reverse function of the function f.

In the case where the relationship between the current of the coil and the magnetic force generated by the coil are formed into the database through the magnetic field analyses, the experiments and the like, it is possible to read out the current value for generating the necessary magnetic force from the database.

$$Iax = f^{-1}(Fax) \quad (21)$$

$$Iay = f^{-1}(Fay) \quad (22)$$

$$Ibx = f^{-1}(Fbx) \quad (23)$$

$$Iby = f^{-1}(Fby) \quad (24)$$

Figure 10:
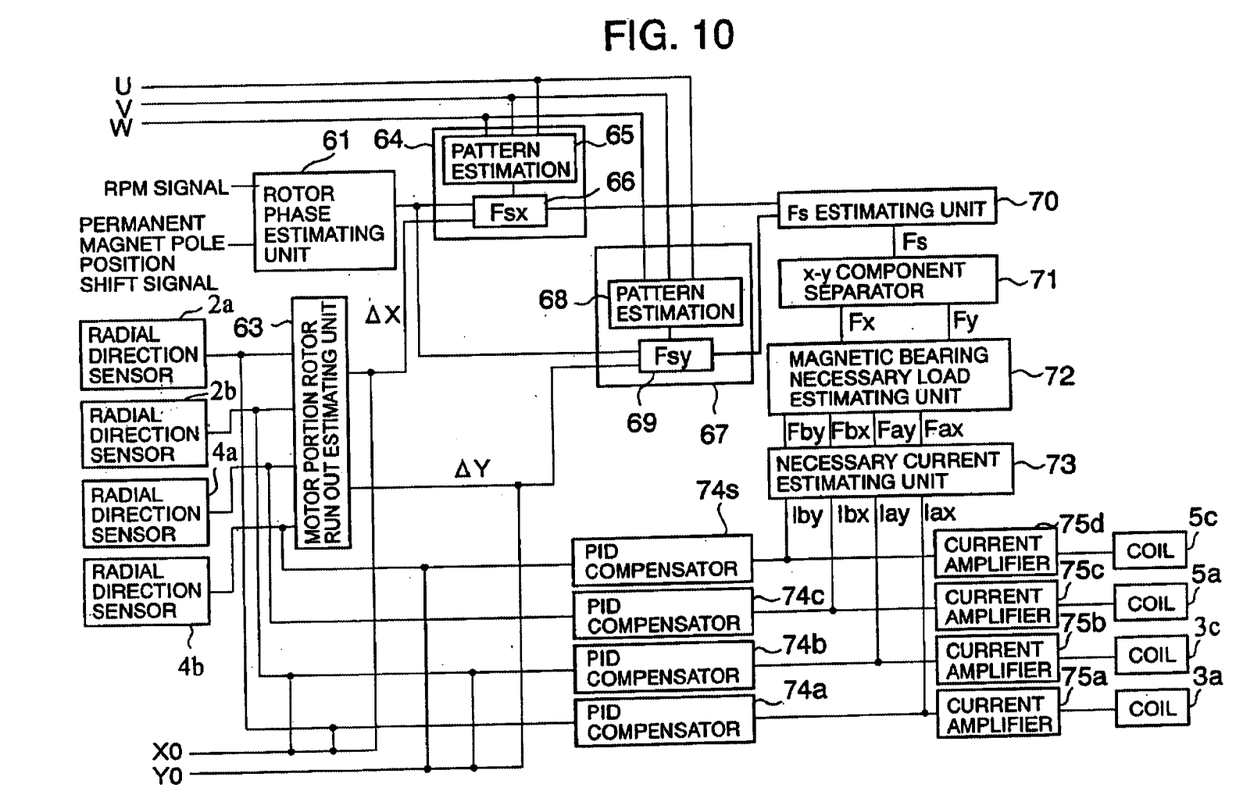
FIG. 10 is a block diagram showing a control system of the magnetic bearing apparatus according to the present invention.

FIG. 10 is a block diagram showing a control unit 80 of the magnetic bearing apparatus in accordance with the embodiment.

A rotor phase estimating unit 61 receives a magnetic pole switchover signal of the permanent magnet 11 and an rpm signal of the rotor 1 and outputs the position of the magnetic poles of the permanent magnet 11.

The rpm signal represents the rpm of the rotor 1 and the permanent magnet pole position switchover signal represents the timing when the switchover or junction position of the poles of N-pole and S-pole of the permanent magnet 11 passes through the sensor installed within the motor. The position of the magnetic poles of the permanent magnet 11 is inferred from both signals. This is outputted to an Fsx calculation section 66 and an Fsy calculation section 69. Here, if the permanent magnet pole position switchover signal is counted, the rpm signal may be obtained and the rpm sensor per se may be dispensed with.

The radial direction sensors 2a and 2b of the bearing portion 8 and the radial direction sensors 4a and 4b of the bearing portion 9 are connected to a motor portion rotor run-out estimating unit 63. The xy components of the run-out of the rotor 1 in the bearing portions 8 and 9 are detected by means of the respective sensors. These values are inputted into the motor portion rotor run-out estimating unit 63. The motor portion 10 rotor run-out estimating unit 63 calculates and outputs the run-outs $\Delta X$ and $\Delta Y$ of the rotor 1 in the motor portion 10 on the basis of Formulae (4) and (5). Then, X0 and Y0 are added to $\Delta X$ and $\Delta Y$, and X-+$\Delta X$ and Y0+$\Delta Y$ are inputted into an Fsx calculation section 66 and an Fsy calculation section 69, respectively.

An Fsx estimating unit 64 is composed of a pattern estimating section 65 and the Fsx calculation section 66. The pattern estimating section 65 monitors the currents of the U-phase, V-phase and W-phase motor windings and infers the magnetic field generated by the coil 6 as shown in FIG. 8, i.e., the pattern of the magnetic field.

The Fsx calculation section 66 obtains the pattern of magnetic field from the pattern estimating section 65 and the position of the magnetic poles of the rotor 1 from the rotor phase estimating unit 61 to thereby infer the y. Fsx calculation section further obtains the value obtained by adding the run-out $\Delta X$ of the rotor 1 in the motor portion 10 to X0 from the motor portion rotor run-out estimating unit 63. Fsx is inferred in accordance with the table shown in FIG. 8 from these three values, i.e., the magnetic pattern, γ, and $\Delta X$. Fsx is the magnetic force in the -y' direction generated by the run-out $\Delta X$ in the x' direction of the rotor 1.

An Fsy estimating section 67 is composed of a pattern estimating section 68 and the Fsy calculation section 69 and infers the magnetic force generated in the -x' direction when the rotor 1 is swung in the y' direction, i.e., Fsy in the same manner as in the Fsx estimating unit 64.

An Fs estimating unit 70 receives Fsx and Fsy from the Fsx calculation section 66 and Fsy calculation section 69 and composes Fs from Formula (12). Fs is the unbalance of the magnetic force that the rotor 1 received from the magnetic field in the motor portion 10 and this amount is the vector amount.

An x-y component separator 71 receives the vector amount Fs from the Fs estimating unit 70 and decomposes this into Fx and Fy in the x-y coordinate system fixed to the coil 6 or the bearing portions 8 and 9. Fx and Fy are an x component and a y component of the unbalance of the magnetic force applied to the rotor 1 from the magnetic field generated by the coil 6 by the run-out in the motor portion 10 of the rotor 1. A magnetic bearing necessary load estimating unit 72 calculates magnetic forces Fax, Fay, Fbx and Fby generated in the magnetic bearing portions 8 and 9 that are necessary for offsetting Fx and Fy from the balance of the moments about the gravity and the balance of the forces applied to the rotor 1 represented by the Formulae (13) to (16).

A necessary current estimating unit 73 receives the signals of the values of the magnetic forces Fax, Fay, Fbx and Fby from the magnetic bearing necessary load estimating unit 72, infers the current Iax, Iay, Ibx and Iby that are necessary to generate these magnetic forces by the coils 6 and feed the signal for generating these currents to current amplifiers 75a to 75d.

Also, the radial direction sensors 2 and 4 are connected to the coils 3 and 5 of the magnetic bearing portions 8 and 9 through PID compensators 74a to 74d and current amplifiers 75a to 75d. This system of the control circuit 80 has been conventionally used to control the magnetic bearing apparatus. This portion operates as follows.

The radial direction sensor 2a of the magnetic bearing portion 8 detects the run-out in the x direction of the rotor 1 in the vicinity of the magnetic bearing 8 and outputs its signal to the PID (Proportional Integral Derivative) compensator 74a. This is a portion for performing the normal PID control to the magnetic bearing portions 8 and 9.

The term PID control means control of the coil currents for causing the change of the magnetic attractive force between the rotor 1 and the coil 3 to be in proportion to the velocity and the run-out of the rotor. The magnetic bearing apparatus obtains the bearing force through PID control. Namely, if the rotor 1 is swung one way in the radial direction, the magnetic force of the coil 3 is fed back and controlled so that this run-out is returned back or eliminated.

The output signal of the PTD compensator 74a is amplified in the current amplifier 75a and a predetermined current is fed to the coil 3a. Then, the rotor 1 obtains the predetermined attractive force in the x direction of the bearing portion 8 and is supported at a predetermined air gap with respect to the coil 3.

A current value from the necessary current estimating unit 73 is added to the current value to be fed from the PID compensator 74a to the current amplifier 75a. Then, the magnetic field generated by the coil 3a is obtained by superimposing the bearing force for holding the rotor 1 in a predetermined position and the magnetic force Fax for offsetting the unbalance of the magnetic force by the magnetic field generated due the motor portion 10.

The control of the magnetic bearing portion 8 in the y direction and the control of the attractive force in the x and y direction in the magnetic bearing 9 are performed in the same way.

By thus constituting the magnetic bearing apparatus 80, it is possible to offset the unbalance of the magnetic forces generated in the motor portion 10 due to the run-out of the rotor 1 and to thereby suppress the vibration generated in the stator.

In this embodiment, the run-out of the rotor in the motor portion 10 is inferred from the run-out of the rotor 1 with the radial direction sensors 2 and 4, whereby the unbalance of the magnetic forces applied to the rotor 1 is inferred. However, for example, it is possible to install a magnetic flux detector sensor in the interior of the motor portion 10, to directly detect the magnetic flux in the air gap within the motor with this sensor and infer the unbalance of the magnetic forces applied between the rotor 1 and the coil 6 from this value.

In this embodiment, the magnetic force that the rotor 1 receives is determined by the experiments or the like from $\Delta X$, γ and the pattern of the magnetic field, and the like. However, in the case where the magnetic flux detector sensor is used, the relationship among the pattern of the magnetic field, γ, the output of the magnetic flux detector sensor and the magnetic force that the rotor 1 receives is obtained through the experiments, the magnetic field analyses and the like and formed into the database. Then, this database is searched from the output of the magnetic flux sensor, γ, and the magnetic pattern upon the operation of themagnetic bearing apparatus to thereby infer Fsx and Fsy.

Also, if an acceleration meter or a vibration meter or the like is mounted on a casing of the magnetic bearing apparatus or the motor portion 10, whereby the vibration of the motor portion 10 is detected, and the control unit for adjusting the current of the coil of each magnetic bearing portion is added so as to reduce the vibration, it is possible to further suppress the vibration of the magnetic bearing apparatus.

According to the present invention, it is possible to reduce the vibration due to the unbalance of the magnetic force of the motor caused by the run-out of the rotor and to perform the miniaturization of the magnetic bearing portion and the high efficiency.

Also, the hardware structure of the magnetic bearing apparatus may be used without any change to the convention one. It is unnecessary to newly add the radial direction sensors. What is necessary is to add only the structure of the converters for converting the magnetic force generated in the coil into the current value flowing through the coil, an estimating unit for estimating the unbalance of the magnetic force within the motor by using a memory or the like or a microcomputer (Microprocessor) or DSP (Digital Signal Processor) within the magnetic bearing control unit.

Also, in order to directly infer or measure the run-out of the rotor in the motor portion 10, it is possible to obtain the run-out of the rotor in the motor with high precision.

If the function to make it possible to miniaturize the actual vibration (acceleration) is added on the basis of the vibration generated to the outside of the magnetic bearing apparatus, it is possible to further enhance the vibration suppression effect.

What is claimed is:

1. A magnetic bearing apparatus comprising: a rotor; a motor having stator coils for generating a rotary magnetic field for rotating the rotor; magnetic supporting coils for producing a magnetic force for magnetically supporting the rotor in a radial direction thereof; a radial position sensor for detecting movement of the rotor in the radial direction thereof in the vicinity of the radial posistion sensor; composite magnetic force inferring means for inferring composite vectors of the magnetic force affecting the rotor based on the rotary magnetic field and the radial position of the rotor; and magnetic support adjustment means for adjusting the magnetic force produced by the magnetic supporting coils to cancel the composite vectors of the magnetic force in the motor.

2. A magnetic bearing apparatus according to claim 1, wherein the rotor is supported by the magnetic supporting coils at a postition at which an axis of rotation of the rotor passes through a gravitational center of the rotor.

3. A magnetic bearing apparatus according to claim 2; wherein the composite magnetic force inferring means comprises a magnetic flux detector for detecting a magenetic flux existing in an air gap between a magnetic pole of the rotor and the stator coils, and second inferring means for inferring the composite vectors of the magnetic force affecting the rotor from the magnetic flux detected by the magnetic flux detector.

4. A magnetic bearing apparatus according to claim 3; wherein the motor is a brushless DC motor comprised of a plurality of magnetic poles fixed to the rotor and a plurality of coils wound around the respective magnetic poles.

5. A magnetic bearing apparatus according to claim 1; wherein the motor is a brushless DC motor comprised of a plurality of magnetic poles fixed to the rotor and a plurality of coils wound around the respective magnetic poles.

6. A magnetic bearing apparatus according to claim 5; further comprising inferring means for inferring movement of the rotor in the radial direction in the vicinity of the motor based on a positional relationship between the radial position sensor and the motor and an amount of movement of the rotor detected by the radial position; and wherein the composite magnetic force inferring means comprises calculating means for calculating composite vectors of the magnetic force affecting the rotor on the basis of a rotational angle of magnetic poles of the rotor, a magnetic field generated by the stator coils of the motor, and the movement of the rotor in the radial direction in the vicinity of the motor inferred by the inferring means.

7. A magnetic bearing apparatus according to claim 6; wherein the calculating means calculates the composite vectors of the magnetic force affecting the rotor on the basis of a database of composite vectors of the magnetic force affecting the rotor and a relationship thereof to the radial movement of the rotor, the rotational angle of the magnetic poles of the rotor, and the magnetic field generated by the stator coils of the motor.

8. A magnetic bearing apparatus according to claim 1; wherein the magnetic support adjustment means adjusts the magnetic force produced by the supporting coils to reduce vibration of the motor caused by unbalance in a magnetic force generated by the motor and represented by the composite vectors.

9. A magnetic bearing apparatus comprising: a rotor; a motor having stator coils for generating a rotary magnetic field for rotating the rotor; magnetic supporting coils for producing a magnetic force for magnetically supporting the rotor in a radial direction thereof; a radial position sensor for detecting radial movement of the rotor in the vicinity of the radial position sensor; composite magnetic force determining means for determining composite vectors of a magnetic force affecting the rotor based on the rotary magnetic field and the radial position of the rotor; and magnetic support adjusting means for adjusting the magnetic force produced by the magnetic supporting coils to cancel unbalance in the magnetic force affecting the rotor and represented by the composite vectors of the magnetic force, to thereby reduce vibration of the rotor.

10. A magnetic bearing apparatus according to clam 9; wherein the composite magnetic force determining means comprises a magnetic flux detector for detecting a magnetic flux in an air gap between a magnetic pole of the motor and the stator coils, and means for determining the composite vectors of the magnetic force affecting the rotor based upon the magnetic flux detected by the magnetic flux detector.

11. A magnetic bearing apparatus according to claim 10; wherein the motor is a brushless DC motor comprised of a plurality of magnetic poles fixed to the rotor and the plurality of stator coils wound around the magnetic poles.

12. A magnetic bearing apparatus according to claim 9; wherein the motor is a brushless DC motor comprised of a plurality of magnetic poles fixed to the rotor and the plurality of stator coils wound around the respective magnetic poles.

13. A magnetic bearing apparatus according to claim 9; wherein the composite magnetic force determining means comprises means for detecting radial movement of the rotor in the vicinity of the motor based on an output of the radial position sensor and a positional relationship between the radial position sensor and the motor, and calculating means for calculating the composite vectors of the magnetic force affecting the rotor on the basis of a rotational angle of magnetic poles of the rotor, a magnetic field generated by the stator coils, and the radial movement of the rotor in the vicinity of the motor.

14. A magnetic bearing apparatus according to claim 13; wherein the calculating means calculates the composite vectors of the magnetic force affecting the rotor on the basis of a database of from which the composite vectors affecting the rotor are obtained based on stored data showing a relationship between the composite vectors affecting the rotor, radial movement of the rotor, a rotational angle of the magnetic poles of the rotor, and the magnetic field generated by the stator coils of the motor.

* * * * *